US008924845B2

(12) United States Patent
Hagerott et al.

(10) Patent No.: US 8,924,845 B2
(45) Date of Patent: Dec. 30, 2014

(54) WEB APPLICATION CODE DECOUPLING AND USER INTERACTION PERFORMANCE

(75) Inventors: Steven G. Hagerott, Wichita, KS (US); John LaBanca, Atlanta, GA (US)

(73) Assignee: LSI Corporation, San Jose, CA (US)

( * ) Notice: Subject to any disclaimer, the term of this patent is extended or adjusted under 35 U.S.C. 154(b) by 1560 days.

(21) Appl. No.: 12/070,722

(22) Filed: Feb. 20, 2008

(65) Prior Publication Data

US 2009/0210781 A1 Aug. 20, 2009

(51) Int. Cl.
| | | |
|---|---|---|
| *G06F 17/00* | (2006.01) | |
| *G06F 17/20* | (2006.01) | |
| *G06F 17/21* | (2006.01) | |
| *G06F 17/22* | (2006.01) | |
| *G06F 17/24* | (2006.01) | |
| *G06F 17/25* | (2006.01) | |
| *G06F 17/26* | (2006.01) | |
| *G06F 17/27* | (2006.01) | |
| *G06F 17/28* | (2006.01) | |
| *G06F 9/44* | (2006.01) | |
| *G06F 15/16* | (2006.01) | |

(52) U.S. Cl.
CPC .................................... *G06F 9/4443* (2013.01)
USPC ............................ 715/234; 717/108; 709/203

(58) Field of Classification Search
USPC .................... 715/234, 221; 717/108; 709/203
See application file for complete search history.

(56) References Cited

U.S. PATENT DOCUMENTS

| | | | | |
|---|---|---|---|---|
| 6,496,203 B1* | 12/2002 | Beaumont et al. | ............ | 715/762 |
| 7,222,303 B2* | 5/2007 | Oren et al. | .................... | 715/744 |
| 7,412,655 B2* | 8/2008 | Wada et al. | ................... | 715/744 |
| 7,676,762 B2* | 3/2010 | Shafron | ......................... | 715/826 |
| 7,890,572 B2* | 2/2011 | Goodman et al. | ............ | 709/203 |
| 7,890,604 B2* | 2/2011 | Millington et al. | ........... | 715/221 |
| 2003/0105882 A1* | 6/2003 | Ali et al. | ....................... | 709/310 |
| 2003/0160813 A1* | 8/2003 | Raju | .............................. | 345/730 |

OTHER PUBLICATIONS

Ajax Tutorial (Asynchronous Javascript And XML), (c) 2006-2007 Denis Sureau and xul.fr—print, http://replay.web.archive.org/20070217173655/http://www.xul.fr/en-xml-ajax.html.*
Layout Manager, Yahoo Developer Network, Feb. 21, 2008, Publisher: Yahoo.com, Published in: US.
Build AJAX Apps in the Java Language, Google Web Toolkit, Feb. 20, 2008, pp. 1-2, Publisher: http://code.google.com/webtoolkit/, Published in: US.
Dynamic Web Page, Feb. 9, 2008, pp. 1-3, Publisher: http://en.wikipedia.org/wiki/Dynamic_web_page, Published in: US.

(Continued)

*Primary Examiner* — Kyle Stork
*Assistant Examiner* — Nicholas Hasty
(74) *Attorney, Agent, or Firm* — Suiter Swantz pc llo

(57) ABSTRACT

An improved web browser architecture for an OOP application for a dynamic web page using a client-side scripting language in JavaScript and Ajax to encapsulate presentation logic as objects manipulated by a mediator class state controller object. The browser code is divided into reusable but decoupled and interacting objects. The objects publish to unknown subscribers, and there is no need for objects to explicitly know of or be bound to other objects subscribing to events, consistent with a delegate model. The state of the web browser can be maintained by the state controller, and bookmarking of the state of the web browser allows reconstruction of a web browser dynamic web page. In a preferred embodiment, a GUI for the web browser controls a SAN.

20 Claims, 5 Drawing Sheets

(56) References Cited

OTHER PUBLICATIONS

Javascript Libraries Roundup, eDevil's weblog, Nov. 14, 2005, pp. 1-33, Publisher: http://edevil.wordpress.com/2005/11/14/javascript-libraries-roundup/, Published in: US.

Prototype JavaScript Framework: Easy Ajax and DOM Manipulation for Dynamic Web Applications, Feb. 20, 2008, p. 1 Publisher: http://www.prototypejs.org/, Published in: US.

Thomas Fuchs, script.aculo.us:It's About the User Interface, Baby!, Feb. 20, 2008, pp. 1-3, Publisher: http://script.aculo.us, Published in: US.

Roland Schneider, StaMa State Machine Controller, www.codeplex.com, Feb.6, 2008, pp. 1-4, Publisher: Microsoft, Published in: US.

Swing (Java), Feb. 9, 2008, pp. 1-8, Publisher: http://en.wikipedia.org/wiki/Swing_(Java), Published in: US.

Christian Heilmann, Yuidomcollapse—Turn Any Element Into a Show and Hide Trigger, Feb. 20, 2008, pp. 1-3, Publisher: http://onlinetools.org/tools/yuidomcollapse/, Published in: US.

\* cited by examiner

FIG. 3A

WEB APPLICATION CODE DECOUPLING AND USER INTERACTION PERFORMANCE

CROSS-REFERENCE TO RELATED APPLICATIONS

[none]

BACKGROUND OF THE INVENTION

1. Field of Invention

The present invention relates generally to the art of a browser based web interface for controlling and displaying information for a Storage Area Network (SAN).

2. Description of Related Art

A Storage Area Network (SAN) often connects multiple servers to a centralized pool of disk storage. A SAN can treat all the storage as a single resource, improving disk maintenance and backups. In some SANs, the disks themselves can copy data to other disks for backup without any computer processing overhead. The SAN network allows data transfers between computers and disks at a high peripheral channel speeds, with Fibre Channel as a typical high-speed transfer technology, as well as SSA (Serial Storage Architecture) and ESCON channels. SANs can be centralized or distributed; a centralized SAN connects multiple servers to a collection of disks, while a distributed SAN typically uses one or more Fibre Channel or SCSI switches to connect nodes. Over long distances, SAN traffic can be transferred over ATM, SONET or dark fiber. A SAN option is IP storage, which enables data transfer via IP over fast Gigabit Ethernet locally or via the Internet.

A scripting language is a high-level programming or command language that is interpreted rather than compiled. JavaScript is widely used scripting language used on Web pages. JavaScript is an object oriented programming (OOP) scripting language supported in Web browsers. JavaScript adds interactive functions to HTML pages. On the client, JavaScript is maintained as source code embedded into an HTML page. JavaScript is compiled into bytecode (intermediate language), similar to Java or C# programs. JavaScript is used in client side scripting languages to run dynamic web pages. JavaScript is often used to refer to ECMAScript or JScript, and this convention will be adhered to herein, as well as referring to any derivative of a scripting language based on ECMAScript, e.g., ActionScript.

A dynamic web page is a web page that changes interface behavior depending on user input and the presence of client-side and/or server side scripting, and stands in contrast to a static web page, that shows the same information to all users. Dynamic HTML is either a general term for HTML web pages that are customized for each user, or, is a combination of HTML enhancements, scripting language and interface that are used to deliver animations, interactions and dynamic updating on web pages. Two major elements of dynamic HTML are the ECMAScript language and the DOM object model. DOM is an interface that presents the HTML document to the programmer as an object model for ease in updating.

Ajax (Asynchronous JavaScript And XML) is a group of inter-related web development techniques for creating interactive web applications. A characteristic feature is exchanging small amounts of differential data between a web page and a web server rather than reloading the entire web page. JavaScript is the scripting language in which Ajax function calls are made, as well as using DOM (Document Object Model, a platform and language-independent object model for representing HTML or XML formats), HTML/XHTML/XML, CSS (Cascading Style Sheets), and an XMLHttpRequest object, to exchange data asynchronously with a Ajax web server to request and return data without having to reload and marshal loosely coupled web pages as much, relying on "load on demand". Ajax consequently also results in smaller bandwidth usage and quicker response time for a user of a web browser due to smaller network latency. The JavaScript function making AJAX possible is the XMLHTTPRequest object, which was added to the JavaScript runtime module in various Web browsers; it was first available in IE 5, Mozilla 1.0, Safari 1.2 and Opera 8. The XMLHTTPRequest object returns the data formatted in a DOM document; it can also be returned as just a string, whether in XML structure or just text.

JSON (JavaScript Object Notation) is a format for exchanging structured data, such as in serialization, and is often used in Ajax programming in lieu of the XML format.

Delegates are used to encapsulate functions in object oriented programming (OOP) into callable functions, akin to "function pointers" in C and C++. Delegates are type-safe, allowing errors to be caught more easily. Delegates can be used as functors, that implement functionality depending on the signature of the declared delegate. Delegates can be used as callback functions and function pointers in C/C++, and as event handing in C#. In an OOP language like C#, any class can publish a set of events, using delegates, that another class can subscribe to, with the originator classes defining one or more callback functions that one piece of code can define and another can implement. In C# an event receiver (the 'member function') can subscribe to events published by an 'instance' object, e.g. a button click, and execute code in response to the button click, so long as the instance and member functions are linked by the delegate convention. By way of example, two windows, "MyWindow1" and "MyWindow2", forming instances, can have a button on them that is an instance object, that, when clicked, each call a member function "ButtonClick" that performs some function in response to the button click in either of the two windows. There is no need to directly link the event receiver and the event publisher classes to one another using explicit names, rather, so long as the event receiver class subscribes to the event publisher class in accordance with the delegate model convention, communication can occur 'behind the scenes'. This generally can be termed a delegate model, or event publisher/event subscriber ("pub-sub") model.

In OOP, a mediator pattern is a software design pattern that provides a unified interface to a set of interfaces in a subsystem, typically through classes. A mediator pattern was one of the software design patterns described by the so-called "Gang-Of-Four" of Gamma et al. in Design Patterns: Elements of Reusable Object-Oriented Software (1994). For example, if a program is made up of a large number of classes, with logic and computation distributed among these classes, a mediator class can be the only class that has detailed knowledge of the methods of other classes. The other classes would send messages to the mediator when needed and the mediator would pass message to any other classes. The mediator class promotes a looser coupling between the classes.

PHP (PHP Hypertext Preprocessor) is a scripting language used to create dynamic Web pages, with syntax from C, Java and Perl. PHP code is embedded within HTML pages for server side execution, and is commonly used to extract data out of a database and present it on the Web page. PHP can be compared to other server-side scripting languages like Microsoft's ASP.NET or Sun Microsystems' JavaServerPages and mod perl, which provide dynamic content to the client from a web server.

In the prior art there exists, even after the advent of Ajax, a need to better control data on the browser (client) side, using JavaScript code and to encapsulate portions of a web application into separate objects. Furthermore, there is a need to better decouple all of this JavaScript code and the corresponding objects from each other, and to encapsulate portions of a web application into separate objects, in order to maximize the reuse and recombination of these objects. Further, due to the network latency between client and server, there is a need to make the response times of the application to user input on the order of milliseconds, to make the web applications respond like desktop applications. This response time is very difficult to achieve if the response requires new components (tabulated data, data in trees, buttons, graphics, and the like) to be shown on a page. Finally, there is a need to use such a scheme for controlling and displaying information for a Storage Area Network (SAN).

Thus what is lacking in the prior art is a method and apparatus for an improved system employing a decoupled OOP client side scripted web browser-based system to control and display information for a SAN, such as taught in the present invention.

SUMMARY OF THE INVENTION

Accordingly, an aspect of the present invention is an improved apparatus and method for the creation of an OOP application employing a JavaScript state controller object as an extension of a web browser's event handling in a dynamic web page, to handle objects in an encapsulated manner from the browser on the client side rather than the server side, in a delegate or subscriber/publisher (pub-sub) model, using a client-side scripting language in JavaScript, and using Ajax to communicate with a server.

The present invention further allows the JavaScript objects to only be rendered a single time rather than multiple times, and provides for delayed rendering.

The present invention provides for a JavaScript state controller object, running completely in the browser, which acts as the subscriber to published JavaScript object's events. The state controller contains the application logic to allow or disallow state changes, which includes which elements of a web page (the JavaScript objects) are shown or hidden to a user of the web browser. The state controller also controls the event and data exchange between JavaScript objects when an application is in a fixed state. The JavaScript objects are designed to an abstract interface which supports the publishing of their events and the methods for the state controller to control their rendering and display.

In the present invention the state controller, when in a given state, can be used to control event and data exchange between JavaScript objects. This allows the JavaScript objects to be fully decoupled from one another and centralizes the application logic and event exchange to a single location.

The present invention thus allows the browser code to be divided into reusable but decoupled and interacting objects. The objects publish events data to unknown subscribers, there is no need for objects to explicitly know or be bound to what other objects are subscribing to published events, consistent with the delegate, pub-sub model.

The present invention separates and consolidates the presentation logic that allows the application to change state and that controls the behavior of the application GUI when in a given state from the business logic that provides database processing and database data to an application, such as a SQL query.

The present invention has a number of advantages over the prior art. For instance, the present invention allows very rapid application response time to user input, and new code does not have to be downloaded to the client when a user makes a selection.

Further, in the present invention application state changes are directly allowed and disallowed by the state controller, based on event and data inputs from the separate JavaScript web page component objects. This allows the set of states for the application to be directly controllable, with fewer indeterminate states, reducing test time, development complexity, and user interface design.

The state controller of the present invention allows a URL-based Application Programming Interface (API) to be developed for an application where the application's state can be directly re-accessed via a bookmarked URL; thus the present invention allows bookmarking.

The sum total of all of the above advantages, as well as the numerous other advantages disclosed and inherent from the invention described herein, creates an improvement over prior techniques.

The above described and many other features and attendant advantages of the present invention will become apparent from a consideration of the following detailed description when considered in conjunction with the accompanying drawings.

BRIEF DESCRIPTION OF THE DRAWINGS

Detailed description of preferred embodiments of the invention will be made with reference to the accompanying drawings. Disclosed herein is a detailed description of the best presently known mode of carrying out the invention. This description is not to be taken in a limiting sense, but is made merely for the purpose of illustrating the general principles of the invention. The section titles and overall organization of the present detailed description are for the purpose of convenience only and are not intended to limit the present invention.

FIG. 3A is a screenshot showing the present invention as instantiated in a preferred embodiment.

Figure 1:
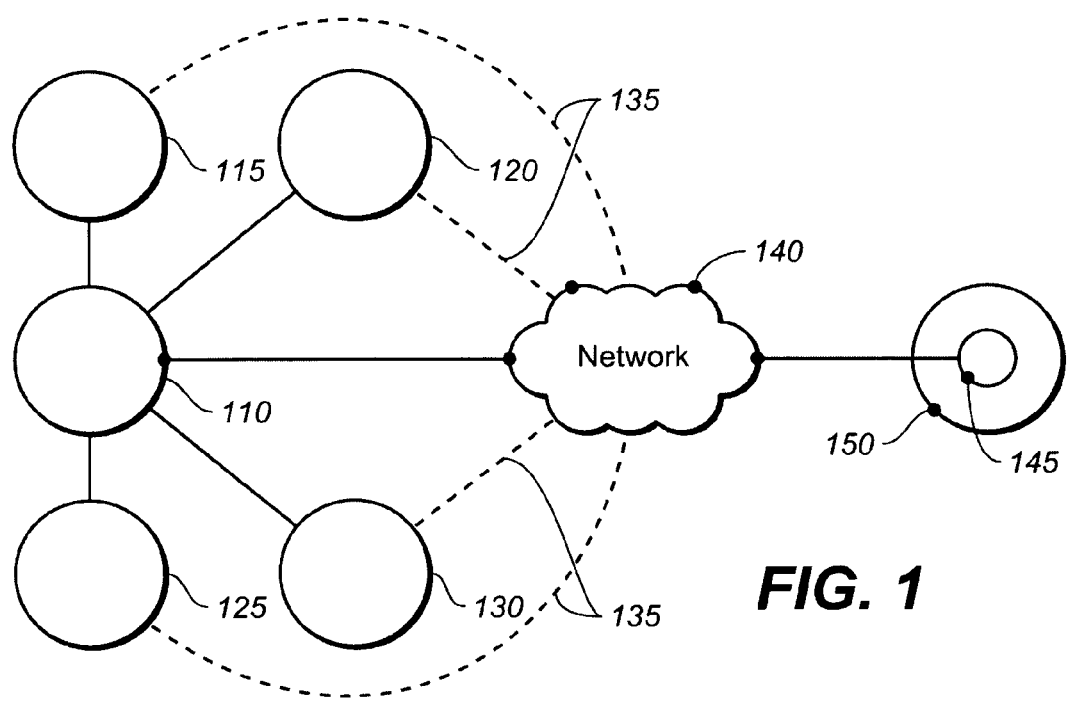
FIG. 1 is a schematic of the architecture of the present invention.

It should be understood that one skilled in the art may, using the teachings of the present invention, vary embodiments shown in the drawings without departing from the spirit of the invention herein. In the figures, elements with like numbered reference numbers in different figures indicate the presence of previously defined identical elements.

DETAILED DESCRIPTION OF THE INVENTION

In a preferred embodiment, the method and apparatus of the present invention is employed on a mainframe or personal computer, and in general any compatible piece of hardware or virtual machine can run the present invention. Thus a preferred method and apparatus of the present invention is a computing platform running a software tool comprising a web browser running on a local machine that houses the present invention, that communicates with a server. The local machine software tool of the present invention can accept human input, and may be written in any computer language (such as C, C++, Perl, Java, or the like), but preferably JavaScript, in an Object Oriented programming (OOP) language, run by a computer system having an operating system. JavaScript is often used to refer to ECMAScript or JScript, and this convention will be adhered to herein, as well as referring to any derivative of a scripting language based on ECMAScript, e.g., ActionScript.

The computer system typically has one or more processors, primary and secondary memory cooperating with the processor(s), which executes instructions stored in the memory, I/O means such as monitor, mouse and keyboard, and any necessary specialized hardware or firmware. Depending on the language used to construct and implement the software tool, the object code of the tool may have any number of classes, functions, objects, variables, templates, lines of code, portions of code and constructs (collectively and generally, "a process step", "step", "block", "method", "module", "object", "functional module" or "software module") to carry out the invention in successive stages as described and taught herein, and may be either a standalone software application, or employed inside of or called by another software application, or as firmware. The software process or software module may be constructed so that one portion of code in the application performs a plurality of functions, as for instance in Object Oriented programming (e.g., an overloaded process). The converse is also true, in that a plurality of portions of code could perform a plurality of functions, and still be functionally the same as a single portion of code. At any stage of the process step of the present invention, intermediate values, variables and data may be stored for later use by the program.

A component of the present invention is the creation of a JavaScript state controller object as an extension of a web browser's event handling, to handle objects in an encapsulated manner from the browser on the client side rather than the server side, in a delegate or subscriber/publisher (pub-sub) model. An event routing mechanism allows certain events data from JavaScript objects (which look like portions of a web page) to be published. Other objects, comprising the state controller, can then subscribe to these events and act on them. The state controller can then, in a global sense for the web page, capture these events, interrogate the data from each interacting object, and allow or disallow state transitions. These state transitions are carried out by using the Document Object Model (DOM) in the browser to show or hide the JavaScript objects.

The present invention also allows the JavaScript objects to only be rendered a single time rather than multiple times, and provides for delayed rendering. The technique of single rendering or delayed rendering enables the application to load all of the objects and any associated background data fetches at once or only once, when needed, which makes the user interaction very fast. All code is downloaded to the client at once, or through delayed downloads using techniques such as lazy loading. All data updates to the browser are then handled by the individual JavaScript objects using Ajax. All JavaScript objects that interact with the state controller are designed with an abstract interface as a wrapper, so that they can all be controlled programmatically by the state controller in a similar manner.

When in a given state, the state controller can be used to control event and data exchange between JavaScript objects. This allows the JavaScript objects to be fully decoupled from one another and centralizes the application logic and event exchange to a single location.

In a preferred embodiment, the state controller receives JavaScript variable inputs from the browser. This data is used by the state controller to reload the application to a given state, with the correct objects displayed, and the correct data loaded into each object.

The present invention provides for a JavaScript state controller object, running completely in the browser, which acts as the subscriber to published JavaScript object's events. The state controller contains the application logic to allow or disallow state changes, which includes which elements of a web page (the JavaScript objects) are shown or hidden to a user of the web browser. The state controller also controls the event and data exchange between JavaScript objects when an application is in a fixed state. The JavaScript objects are designed to an abstract interface which supports the publishing of their events and the methods for the state controller to control their rendering and display.

The present invention has a number of advantages over the prior art. For instance, the present invention allows very rapid application response time to user input, and new code does not have to be downloaded to the client when a user makes a selection. Different JavaScript web component objects are merely shown or hidden to a user. This also automatically helps maintain the state of a JavaScript object, for example a file system tree, between states. If the user wants to go back to a previous state where an object was displayed, the state controller will merely re-show that object. Since the object stays present in memory in the same state, its past condition is still quickly available.

In addition, the present invention allows the browser code to be divided into reusable but decoupled and interacting objects. The objects publish events data to unknown subscribers, there is no need for objects to explicitly know or be bound to what other objects are subscribing to published events, consistent with the delegate, pub-sub model.

Further, in the present invention application state changes are directly allowed and disallowed by the state controller, based on event and data inputs from the separate JavaScript web page component objects. This allows the set of states for the application to be directly controllable, with fewer indeterminate states, reducing test time, development complexity, and user interface design.

The present invention separates and consolidates the presentation logic that allows the application to change state and that controls the behavior of the application GUI when in a given state from the business logic that provides database processing and database data to an application, such as a SQL query.

The state controller of the present invention allows a URL-based Application Programming Interface (API) to be developed for an application where the application's state can be directly re-accessed via a bookmarked URL. Later page loads would be captured by the JavaScript state controller object and the correct application state would be restored based on the JavaScript state controller making the appropriate calls to the web page component objects. This "bookmarkability" is a challenge for traditional prior art Ajax applications, as new page states are no longer controlled by new server side page references. The state controller of the present invention offers a mechanism for bookmarking, even though the page appears to be still the same.

Turning attention to FIG. 1, there is shown a schematic of the architecture of the present invention. In FIG. 1 there is shown the "pub-sub" or delegate model of object oriented programming that forms the heart of the present invention. A plurality of objects 110, 115, 120, 125, 130 interact with one another and through a network 140 such as the internet, with a server application object 145, residing on a server 150. The objects 115, 120, 125, 130 interact with one another through the state controller object 110 and interact with the server application 145 and server 150 directly, as indicated by dashed lines 135 which connect to the network 140 and ultimately the server 150.

The state controller object 110 can form a mediator class, acting as the hub in the center of a spoke and hub system, to coordinate data to and from the other classes surrounding the state controller. More generally, the state controller object 110 works according to a pub-sub model with respect to the other objects 115, 120, 125, 130 by subscribing to events, as an event receiver, that are published by other classes, acting as event publishers, consistent with a delegate/pub-sub mode of communication. The state controller 110 controls when objects 115, 120, 125 and 130 get their data from server application 145 and server 150, however, the objects 115, 120, 125 and 130 are responsible for implementing the Ajax client interfaces to communicate with the server.

Figure 4:
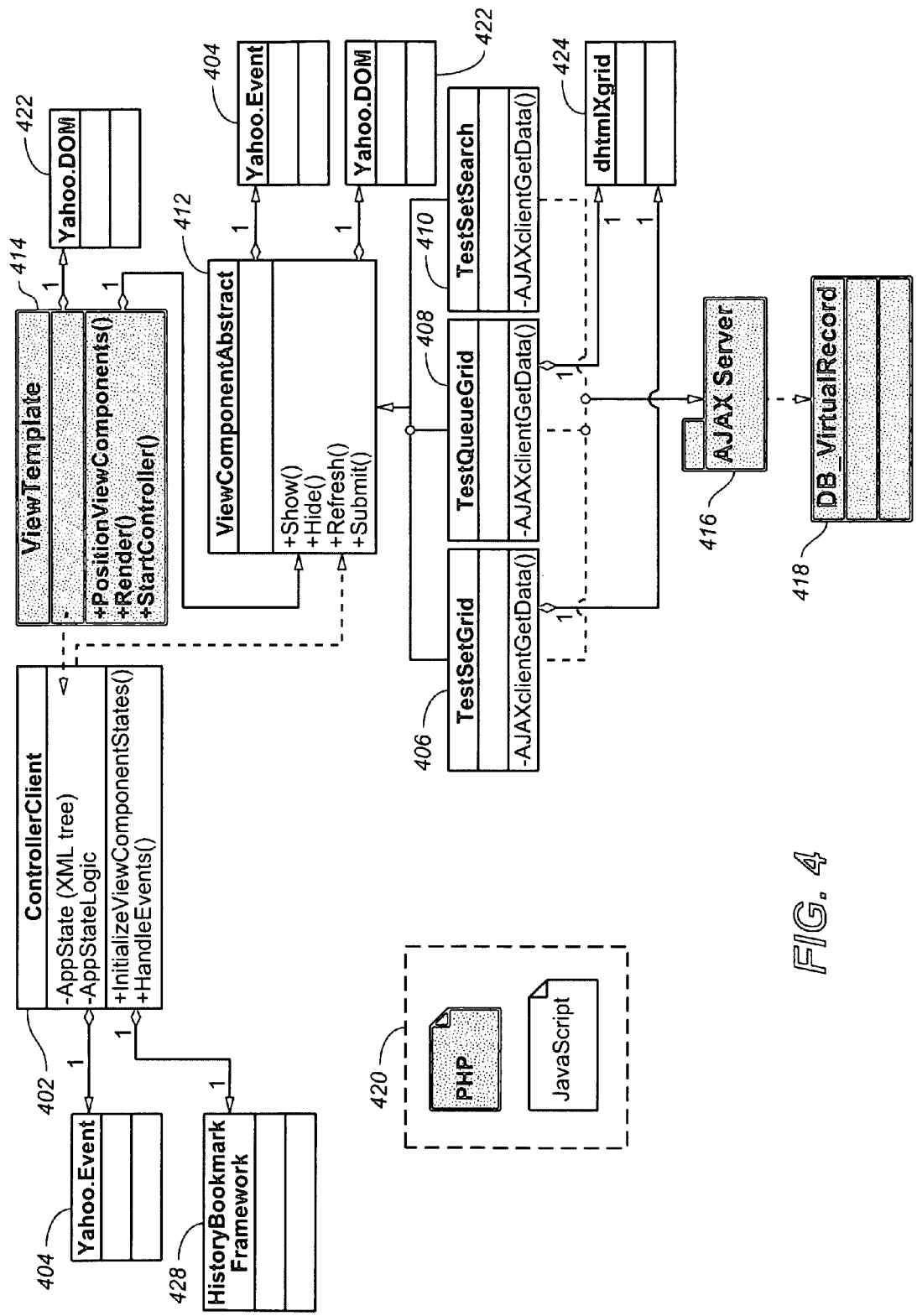
FIG. 4 is a UML diagram for a preferred embodiment of the present invention.

The state controller 110 subscribes to events published by objects 115, 120, 125, 130 and with the server application 145, which may also be thought of as an object and typically is communicating with the web browser of the present invention via Ajax, PHP and JavaScript, with any HTML/XML and related formats represented by the platform-neutral DOM model on the server-side. In a preferred embodiment, a class or view template called "ViewTemplate", as shown further in connection with FIG. 4, is a PHP template that outputs the html structure that defines the containers for each of the JavaScript objects, and, as such, is responsible for the definition of the DOM for all the containers in the application. The location and alignment properties of the containers are also defined by the view template. In this structure, the JavaScript objects such as objects 115, 120, 125 and 130 are placed into the appropriate container as defined in the view template.

The objects 115, 120, 125, 130 and the state controller 110 reside on the local machine of the present invention that comprises a browser, by way of the JavaScript programming language, while the server application 145, resides on a web server 150 far removed from the browser, typically on an intranet or the internet. The present invention transmits JavaScript code from the server application to the browser client, where the present invention resides, for interpretation and running. A typical server application that communicates with the client might be a database application interacting with a database residing on the server, via the SQL language, and returning the results of a SQL query to a client web browser application. A SQL query could include any type of user input, and constructed by a user input GUI component object (e.g., one or more of a series of checkboxes, combo boxes, text boxes and the like), such as one of the objects 115, 120, 125 and 130, and would be passed to the state controller object 110 as event data, which in turn would pass the data to another of the objects 115, 120, 125 and 130, which would then be responsible, in a preferred embodiment, via their Ajax client interfaces, for getting answers and data from the business logic that resides on the server 150. Alternatively the state controller can get answers and data from the business logic that resides on the server 150, and pass these answers and data to one or more of the objects 115, 120, 125 and 130.

Objects 115, 120, 125, 130 might include reusable or one time components in a program, such as GUI components and other visual based presentation logic type component objects, often used to interact with the business logic and data of a database, and display information to a user. These GUI components include but are not limited to: a grid view (e.g., a table with hyperlinks that lead to other tables); a datalist control (a plurality of rows displayed either in a table or free-flowing flow layout); a tree; a forms view or a details view (e.g. single records or rows from the database); various specialized templates such as header, footer, separator, pagination control templates; various GUI controls such as combo boxes, list boxes, radio buttons, checkboxes, buttons, hyperlinks; various other programming data structures such as OOP classes, functions, primitive data structures (e.g., integers, doubles, strings) that relate to GUIs, and the like. This list of GUIs objects is by no means exhaustive. Collectively such objects can be termed presentation logic GUI components or GUI-based objects, to distinguish them from data such as the business logic comprising information such as answers and data relating to SQL queries, database IDs, and the like.

Figure 2:
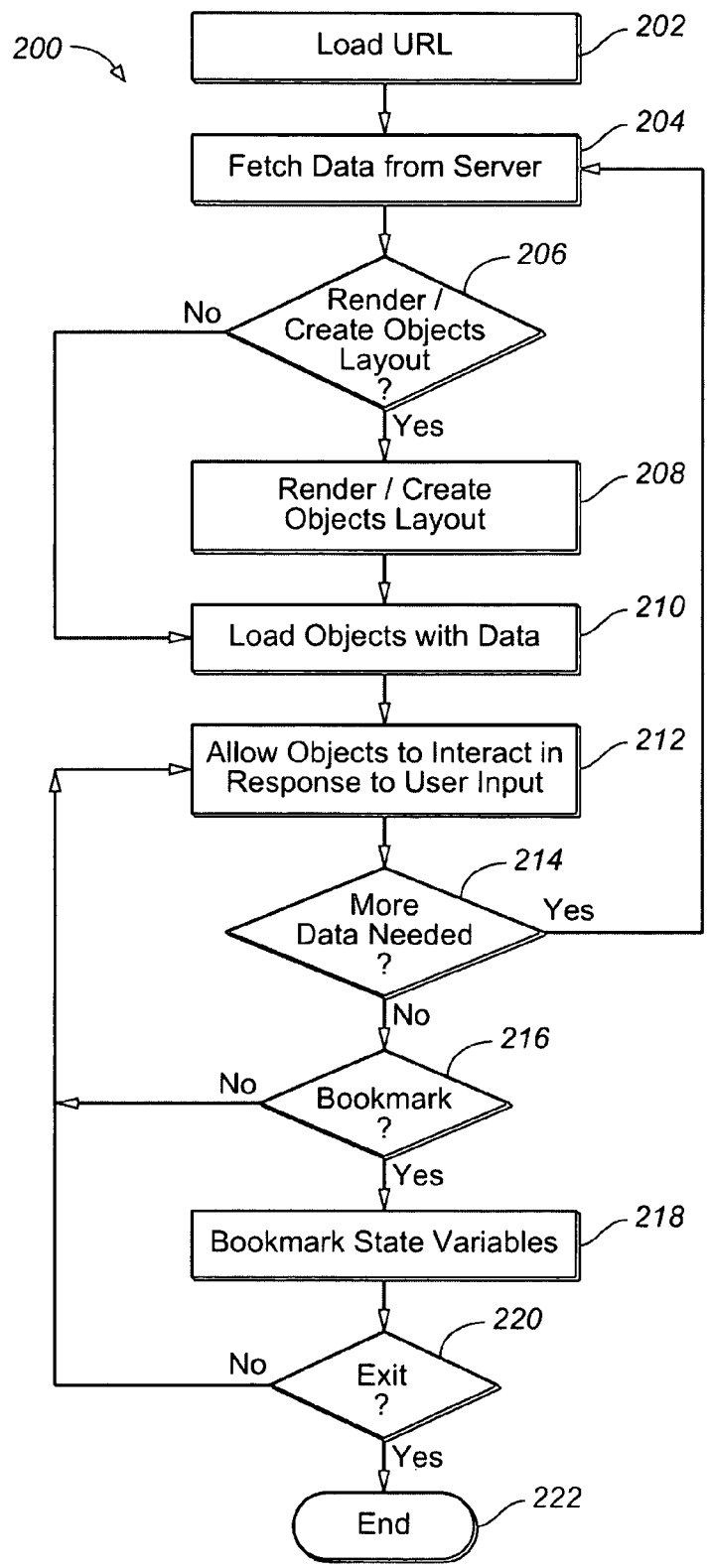
FIG. 2 is a flowchart for the dataflow of the present invention.

Turning attention now to FIG. 2, there is shown a flowchart for the operation of the present invention. It should be understood that since the present invention is programmed as in an OOP language rather than a more traditional non-OOP or procedural language, the steps shown in the procedural flowchart of FIG. 2 are not necessarily followed exactly in a rigid, mathematical manner, rather, the flowchart of FIG. 2 gives the overall operational flow of the program. For example, a countdown timer could be used to fire an event, or an event can be triggered through the delegate model as described herein, and the event can be processed on an demand-based/interrupt-driven manner as required, rather than a strict procedural flow.

The present invention is a web browser application on a local machine that is remote from a web server, as explained in connection with FIG. 1. The web browser of the present invention houses the data and application code, preferably in JavaScript, loads a URL where information for a dynamic web page resides, remote from the web browser, as indicated by step box 202 labeled "Load URL". This URL typically is an address that defines the route to a file on a web server (HTTP server), such as server 150. The invention application fetches data from the web server that maintains the URL, via Ajax, either through a single downloading or a delayed downloading, preferably the latter, at step box 204 labeled "Fetch Data From Server".

The objects such as presentation-logic GUI-based objects 115, 120, 125, 130 in FIG. 1, that will house and process the presentation and business logic data, including JavaScript code forming the present invention, are checked to see if they have been created by the application of the present invention at step box 206 labeled "Render/Create Objects Layout?". If the objects have not already been created, flow proceeds along the "Yes" branch to step box 208, labeled "Render/Create Objects Layout".

Creating the layout of objects such as presentation-logic GUI-based objects 115, 120, 125, 130 of FIG. 1, and where they fit on a dynamic web page, as well as filling them with the JavaScript necessary for them to function—also known as rendering objects—is typically known to be a very time consuming aspect in active web pages, when compared to simply fetching data from a server. Thus at step 208 time is saved by the present invention by creating these objects and filling them with data once or as need be, through the state controller object 110, rather than with every page refresh. Further, a placeholder may be placed for the object before it is created (rendered), a process known as "delayed rendering". Delayed rendering may be where the JavaScript objects are laid out later on, when needed, say for example a rarely used or viewed web page window that is ordinarily hidden except on a rare occasion when a user clicks on another window button or hyperlink. It would not make sense to load into the client side web browser memory the objects associated with this rarely used web page window every time the client browser is started, since there is a good chance the rarely used web page window will never be viewed by a user. Instead, any objects associated with this rarely used web page may be loaded as needed, i.e. by delayed rendering. Delayed downloading (lazy loading) is also supported by the present invention. Code for the present invention can perform lazy loading and then render that code after downloading. From experience, delayed rendering helps the most because it compresses all the JavaScript into a single, minimized file that can be only several hundred kilobytes. It was found that it actually takes more time to add separate things to download from the server, rather than having one big file to download. This is because most browser can only download two things at a time. All downloads can be then serialized, two at a time, from the server to client. This includes all JavaScript files, images, and the like.

Creating the layout of objects via rendering is done server side, by specifying where in a DOM (Document Object Model) for a browser the various objects will be laid out. For example, a layout for a dynamic web page can have a rendering of objects comprising placing the 'history' 'back' and 'forward' buttons for previous views of the web page on the top portion of a browser window, then placing links for a tree (e.g. for a folder explorer) on the left side, a radio button, combo button or checkbox for various user options on the lower left, and a grid view (given data that corresponds to a tree or to a button when clicked), a reset button, and/or a submit/send button on the right side. This layout is specified server side, by server application 145, and relayed to the client side of the present invention during steps 206 and 208.

After the objects are rendered in steps 206 and 208, flow proceeds to step box 210, labeled "Load Objects With Data", where the objects are loaded with the business logic type data fetched from the server. Typical business logic data might be a SQL query result run by the web server 150. This business logic data can be termed "downloaded 'back end' data" or "refreshed 'back end' data" (the back end typically associated with a database at a database web server such as server 150). This data and this step is typically performed in terms of downloaded bandwidth much faster than the rendering data step of box 208 for rendering objects, so a novel method of the present invention is to segregate these two steps as shown, separating the presentation logic from the business logic by way of objects on the client slide.

In step box 212, labeled "Allow Objects To Interact In Response To User Input", the objects interact with one another in response to user input, e.g. one window (or object) can be shown or can be hidden when another window (object) is clicked on by the user. The objects interact with one another through the mediator JavaScript state controller 110, which may also receive data from the server application 145 during this step. In step decision box 214 labeled "More Data Needed?", if more data is needed, it can be fetched from the server 150 that the web browser forming the present invention is operably connected to, to the extent this data cannot be supplied by the user of the web browser application, as can be seen from following the "Yes" branch to box 204. In a preferred embodiment, the state controller 110 calls a "Refresh" or other applicable public method of the other objects that interact with the state controller, such as objects 115, 120, 125 and 130, with the appropriate business logic data such as a SQL query or query definitions and data input as obtained from other objects, in response to user input, such as one or more GUI user input objects (e.g. a checkbox, combo box, and the like). After the "Refresh" is called by the state controller, and the state controller passes any appropriate data from the GUI user input objects to the objects 115, 120, 125 and 130, these other objects will initiate their request of new data from the server, such as server application 145 and/or server 150. Otherwise, if no more data is needed at decision box 214, the program proceeds along the "No" branch to the bookmark aspect of the present invention, in step box 216 labeled "Bookmark?".

In a preferred embodiment, the state controller can receive JavaScript variable inputs from the browser's GET method (URL path). This is used by the state controller to reload the application to a given state, with the correct objects displayed, and the correct data loaded into each object.

In step box 216 labeled "Bookmark?", the web browser application forming the present invention can provide a bookmark to the web browser application itself for a specific state that the application is in, by storing state variables, as described further herein. This bookmarking feature allows an Ajax-based application to be bookmarked at a particular state, a sort of snapshot of the application, giving user interface performance and interactivity advantages. The bookmarking ability allows any view of data within the application to be shared with other users by having the bookmarking user send a bookmark through e-mail, and the like, to the other users, which allows for rapid transmission and sharing of web browser states. Further, it causes the web application forming the present invention to become a common data interchange method, as opposed to a black box where each user has to manually navigate to a state or view.

If a bookmark is desired, flow continues to step box 218 labeled "Bookmark State Variables", where the state variables necessary to recreate the particular state the web application of the present invention is in are stored, and flow continues to decision diamond box 220 labeled "Exit?", and then the program stops at box 222 labeled "End", otherwise flow of the program returns to step box 212.

Figure 3A:
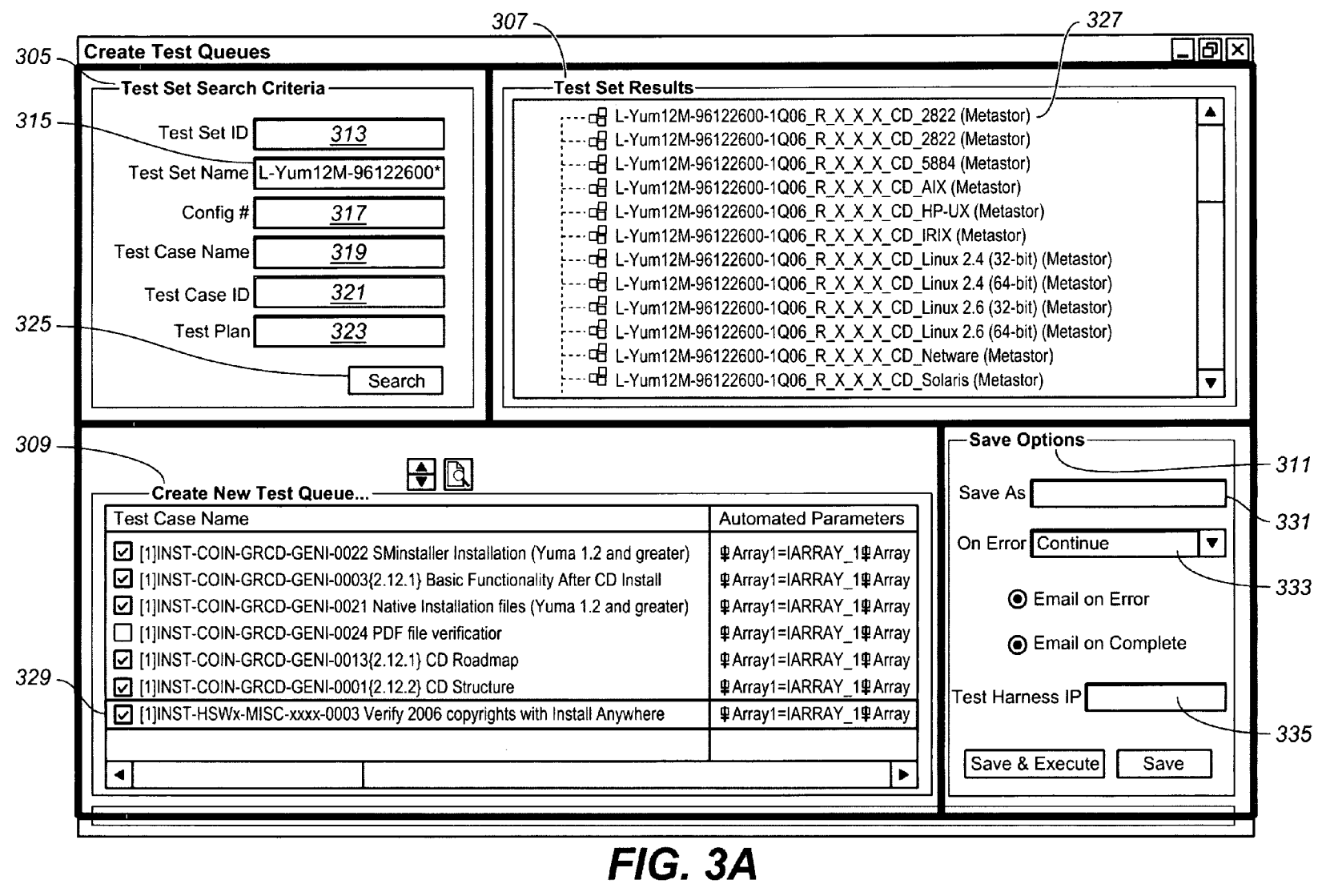

Turning attention now to FIG. 3A, there is a screenshot showing the GUI of the present invention as instantiated in a preferred embodiment. In FIG. 3A a concrete example of the pub-sub model of interaction between the objects of the web browser and the state controller is given. In FIG. 3A, components that can be viewed on a screen are deemed objects. These include the upper left window 305 labeled "Test Set Search Criteria", the upper right window 307 labeled "Test Set Results", the lower left window 309 labeled "Create New Test Queue", and the lower right window 311 labeled "Save Options". Each of these windows are objects that can be turned on to appear (or show) or turned off to disappear (or hide) from the screen by triggering public functions associated with the objects and managed by the state controller, such as state controller object 110 in FIG. 1. Each object can further influence another object by interacting with the state controller, through a public method associated with the object that is called by the state controller. Thus, clicking on a box, window or GUI-based object can publish an event that is subscribed to by the state controller, which can, when it receives the event published, execute a member function from its own state controller member function or from a public member function associated with the object publishing an event, via the delegate/pub-sub model of OOP, to trigger or show another box, window or GUI-based object.

To give a further concrete example of the sequence for the data flow from FIG. 3A, consider the case where first a user can click on the upper left window 305, which is represented by an object, which will activate the state controller via a pub-sub model to provide drop-down boxes or other functionality to one or more of the fields 313, 315, 317, 319, 321 and 323, which are also represented by objects, in the window 305. These fields can be filled in by the user, who then will click on the button 325 labeled "Search", which again will activate the state controller 110 via a pub-sub model to activate a search given the criteria filled in by the user in fields 313, 315, 317, 319, 321 and 323. The state controller 110 or, preferably, the objects 115, 120, 125 and 130 (as indicated by the dashed line 135 in FIG. 1) will communicate with a database located online such as at server 150, to get business logic data via a database query, corresponding to step 214 in FIG. 2, e.g. a SQL language query or other data that resides server side, which can be termed business logic-type or business logic data. Alternatively and equivalently the business logic data could already be loaded in the local web browser of the present invention, depending on the foresight of the programmer. In a preferred embodiment the state controller 110 in fact would pass the business logic—e.g. a search criteria—to an object, such as object 307 in FIG. 3A, while calling an object's public method via the pub-sub model such as the object's "Refresh" method; then, the object would contact the server application 145 and/or server 150 directly, so that object 307 can have its results—e.g. a SQL search query result—such as specific rows 327, updated. Thus, in a preferred embodiment of the invention each object, such as objects 115, 120, 125 and 130 in FIG. 1, that communicate with the state controller 110, is responsible for getting the data it needs from the server directly. Otherwise, the state controller would have object specific code in it, code that would ordinarily be in the objects themselves; but the present invention alternatively envisions even such an arrangement, and for requests from the objects 115, 120, 125 and 130 to pass through controller 110 when communicating with the server. In a preferred embodiment the state controller, such as controller 110 in FIG. 1, is responsible for passing SQL query definitions between objects, such as obtaining user input from a user input GUI and passing it to an appropriate object that must display answers to the SQL query, such as an object from objects 115, 120, 125 and 130, and any data such as business logic data is obtained by the objects 115, 120, 125 and 130 responsible for the display of the data, directly by the objects from the server. The business logic data can be a SQL query result, or any other type of business data that is needed, such as simply the database ID of a desired record or item.

In the present invention in a preferred embodiment there is a generic Ajax client for the basic client side Ajax operations, and each object includes an instance of this Ajax client for its Ajax data needs.

Either way, the results of the search query can be presented in another window 307, labeled "Test Set Results" in FIG. 3A, which will show up when the query is completed. At this point the viewer can select one of the query results by highlighting it, for example the results may be tests that can be run on a SAN from a series of test sets, such as shown in window 307 "Test Set Results" in FIG. 3A. Highlighting or clicking on one or more of these tests set rows 327 will trigger, through the state controller 110, via the pub-sub model, another window to appear, such as window 309 in the lower left of FIG. 3A labeled "Create New Test Queue". This window is loaded with relevant information to tests about to be run in a queue of user specified tests, such as the name of the test and the automated parameters associated with a particular test. The tests awaiting execution in this window 309 can be saved, with various user-defined parameters set, by highlighting a row, such as row 329, in window 309, which will, via the pub-sub model acting through the controller 110, trigger another window 311, labeled "Save Options", to appear and save data associated with these tests to memory, after filling in various parameters such as at fields 331, 333, 335.

Figure 3B:
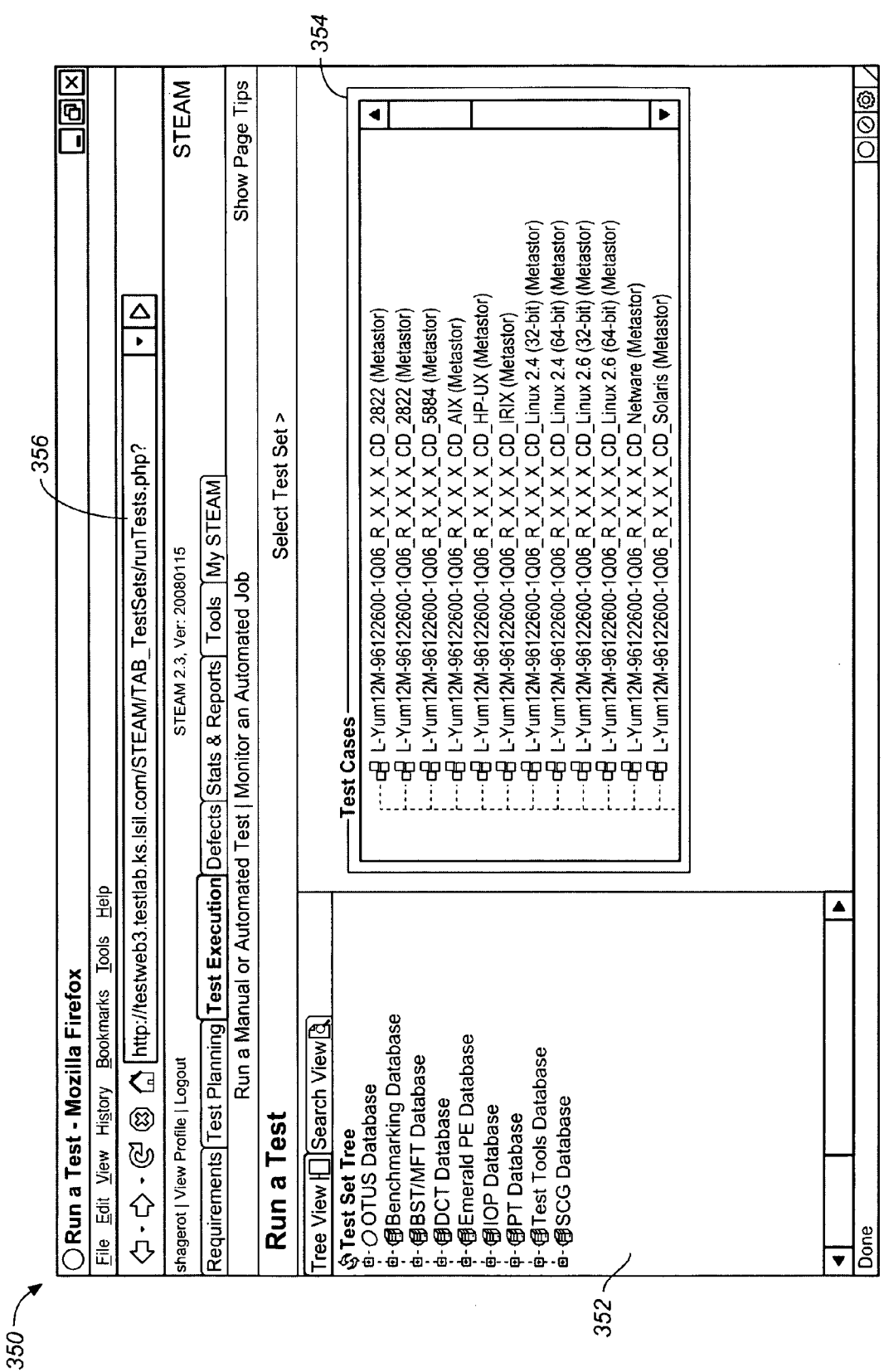
FIG. 3B is a screenshot showing the present invention as instantiated in another preferred embodiment.

Yet another embodiment of a preferred GUI for the present invention is shown in FIG. 3B. A web browser 350 has a tree window 352 labeled "Tree View" on the left hand side, housing a tree as shown. Clicking on a "+" node of a tree node in the tree will expand the tree, which can be collapsed by clicking on a "−" symbol, as is known per se in Windows. By clicking on a tree node, a user can select an element from the tree, which will cause a window to appear in the right hand side of the browser, at window 354 labeled "Test Cases", which can comprise a grid view. This grid view is associated with the tree and is called via the pub-sub model as discussed herein, working through the state controller 110 of FIG. 1. Clicking on rows within the grid of the grid view can in turn cause other windows to pop up or appear, and give a more detailed view of information concerning the clicked-on row. The web browser 350 may have a URL, that resides on the web server 150, such as URL labeled 356 in FIG. 3B. This URL can be shown as the same URL pointed to throughout by the web browser 350, because the invention works behind the scene to change views and is transparent to the user of the invention, hence the same URL can be shown in the web browser even though the view comprised of the GUI and windows will change to the user. Note that this is the case for the present application without the addition of a bookmarking or history framework. If one is to add a bookmarking and history framework, the state of the application will be embedded after the page web address in the browser address bar. It would be followed by GET input parameters that will change as the application state changes and/or different items are selected within the state. A general pattern to expect for the URL would be (removing spaces): http://[page address]?[applicationState=currentState]? [selectedItem=selectedItemID]?[stateVariable=stateVariableValue].

Other types of GUIs are equally envisioned by the present invention, as can be appreciated by one of ordinary skill in the art from the teachings herein. For example, similar to FIGS. 3A and 3B, an email model using the teachings of the present invention can be constructed where a screen is first presented to a user to log on, with a user name and password field shown, then, after logging on, any clicks on the window or fields (e.g. a hyperlink) by the user activates another window, via a pub-sub model, which in turn can show other data associated with the clicked-on window, such as showing email messages from an In box, sent emails in an Out box, and the like. A tree can also show up as a user interface object (such as a folder) when a link or window is clicked upon.

As discussed, the GUI objects 115, 120, 125, 130 of FIG. 1 can be windows, and these windows can comprise a grid (or table). Preferably, for the SAN based GUI applications of the present invention, such a grid used in a preferred embodiment is a grid sold as "DHTMLX LLC" by DHTMLX, a software development company based in Saint Petersburg, Russia. In another preferred embodiment, an open source JavaScript tree from Yahoo! Inc., of Sunnyvale, Calif. was used to interface with an AJAX server for getting tree node data and the abstract interface for event publication. Further, a JavaScript table could be used in lieu of code, with the appropriate abstract interface added on top of it to integrate it with any interface requirements of the present invention.

Yet another example of a GUI in accordance with the present invention is a tree or list in one window, say on the left of a browser screen, that describes a SAN by way of a plurality of storage arrays, using icons for the arrays and names associated with the icons, while on the right, another window could be a grid, such as the grid system sold by DHTMLX, that displays particular information about any particular storage array highlighted on (e.g., clicked on by a user) in the left tree or list window. Thus a user clicking on a component (e.g., a disk drive icon) in the tree or list in the left window will, via the pub-sub model through the state controller, present information such as properties data associated with the icon to the user on the right window, with properties data being information that is particular to the clicked on icon, e.g. the logical (volume or virtual drive), physical drive information, or computers associated with the clicked on left-window drive icon. As before, one window GUI is linked to another window GUI via the state controller, and the "rendering" of objects comprising the positioning of the windows. The downloaded "back end" data or refreshed "back end" data such as the particular information associated with windows (e.g., the name of the clicked on disk drive icon in the left window, or the properties data in the right window) is the business-logic type data that needs to be downloaded from the server. By contrast to this "back end" data, the "rendering" of windows would be handled locally, as presentation type logic data, such as when the objects are created by the web browser of the present invention, e.g. step 208 in FIG. 2, and this data need not be downloaded from the server every time there is a change in state, unlike in some prior art. This feature greatly reduces latency and speeds up the web-based browser application to mimic an application that resides solely on a local hard drive.

Further, each of the data describing the windows and the data needed for transitions going from one window to another are states, as are any data that define a particular state (e.g., the data needed to reproduce each of the windows 305, 307, 309 and 311 in FIG. 3A, or windows 352, 354 in FIG. 3B). This "state data" uniquely defines how the GUI windows appear and the necessary data for what other windows (objects) they transition to when clicked on (typically through the use of public member functions triggered, through the pub-sub model, that receive parameters) and can be stored by the state controller in memory.

Further, in the present invention a particular view of one or more windows in the local web browser can be "bookmarked" and recreated by the state controller 110, by storing state variables and writing this information to be used by an Ajax-compatible browser. There are open-source libraries to perform this bookmarking function, e.g. in one preferred embodiment such as provided by Yahoo! Inc. of Sunnyvale, Calif. (Yahoo has produced their own open source version of bookmarking, presently the product, the Yahoo! UI Library: Browser History Manager, can be found at this URL: http://developer.yahoo.com/yui/history/). The bookmarked information with all the necessary state variables can be sent by a user to another user, to recreate exactly the same view on another Ajax-compatible web browser built in accordance with the present invention.

Turning attention now to FIG. 4, there is shown a framework for a preferred embodiment of the present invention in a UML diagram format. The classes are shown in standard URL format with the class name on top, followed by the member variables (whether marked "+" as public or "−" as private to the class) and then the member functions (whether "+" as public or "−" as private to the class). The arrows show the direction of inheritance, conventionally pointing to the base class, while the number next to the lines show the number of instantiations of each class, with "*" being any number of instantiations. A hollow diamond indicates an aggregation, where two objects have a looser connection to one another than in a composition, shown by a solid diamond, which forms a tighter relationship between classes.

Thus in FIG. 4 a controller class 402 called "ControllerClient" corresponding to state controller object 110, interacts with other classes, such as class 404, "Yahoo.Event", which is open source JavaScript provided by Yahoo! Inc., on showing or hiding an object window. Class 402 also interacts with class 414, a class or view template called "ViewTemplate", and a PHP template that outputs the html structure that defines the containers or 'divs' for each of the JavaScript objects, and, as such, is responsible for the definition of the DOM for all the containers in the application. The location and alignment properties of the containers are also defined by the view template. ViewTemplate relates to how the "div" or containers for information will be laid out on screen (e.g. where the buttons go, where the tree goes, where the checkboxes go in a web browser window view), consistent with the DOM model. This information on how the "div" or containers are laid out is done server side by server 150, and is represented in DOM (Document Object Model) format. This can be thought of as a ViewTemplate, e.g. such as having a tree on the upper right, with a button on the lower left, and the like, and corresponds to the rendering step 208 in FIG. 2. In this structure, the JavaScript objects such as objects 115, 120, 125 and 130 are placed into the appropriate container or 'div' as defined in the view template, class 414. Further, "Yahoo.DOM" event class 422 is a Yahoo User class used to subscribe to DOM events that are thrown by the browser. At present a URL link to it is found at: http://developer.yahoo.com/yui/event/.

In turn, ControllerClient class 402 and ViewTemplate 414 inherits and/or form a composition with class 412, "ViewComponentAbstract", which is an wrapper interface abstract class to interact with, and provide a public interface to, the objects such as classes 406, 408 and 410, labeled "TestSetGrid", "TestQueueGrid" and "TestSetSearch", respectively, which correspond to the objects 307, 309 and 305, respectively, shown in FIG. 3A, and correspond to the windows associated with the events described in FIG. 3A. The classes can be pure JavaScript classes or PHP classes. These classes 406, 408 and 410 which correspond to windows 305, 307, 309 interact with a server that is remote from the web browser of the present invention, such as server 150 in FIG. 1, via the classes represented by the AJAX server class 416 and the class DB_VirtualRecord 418. The DB_VirtualRecord 418 "flattens" database table information into a single flat table and formats it into several XML string formats. This flattening hides the JavaScript in the browser from the database schema, as the database data is typically normalized and spread across several normalized tables. The AJAX server is the web service that responds to http requests from the client and delivers the client requested data to the browser.

Class 424, labeled "dhtmlXgrid" can be any JavaScript enhanced html table that is used to present tabular data. In the present invention instantiation based on FIG. 4 there is used a JavaScript table so that the row click events and record IDs of the selected row can be passed out as an event.

The controller class ControllerClient 402 also can interact with a history/bookmark class 428 labeled "HistoryBookmarkFramework" as described herein, to preserve a snapshot of the present invention, that is preserved by state variables, so a user can recreate the same screen layout as another user, by way of sharing the bookmark.

The use of open source libraries is also encouraged, for example, the class YAHOO. Event is an open source library from Yahoo that is in JavaScript and designed to help show and hide objects.

PHP/JavaScript objects 420 conceptually show the JavaScript classes or PHP classes of the present invention, which are found throughout the invention as described herein.

The various classes and the architecture of the classes as defined by FIG. 4 should not be viewed as limiting the invention, as is but one preferred embodiment of the invention as reduced to practice. Numerous other instantiations may be employed from the teachings herein.

Although the present invention has been described in terms of the preferred embodiments above, numerous modifications and/or additions to the above-described preferred embodiments would be readily apparent to one skilled in the art.

It is intended that the scope of the present invention extends to all such modifications and/or additions and that the scope of the present invention is limited solely by the claims set forth below.

We claim:

1. A non-transitory computer-readable medium comprising a web browser object-oriented application for a dynamic web page comprising:
    a web browser application comprising a state controller object, the web browser application configured to run on a client side, the state controller object configured to run completely within the web browser application as an extension of the web browser application's event handling to handle objects in an encapsulated manner on the client side, the state controller object further configured to allow and disallow state changes of objects on the client side, the web browser application further comprising a plurality of other objects configured to operatively communicate with the state controller object,
    wherein each of the plurality of other objects of the web browser application includes an abstract interface as a wrapper whereby the state controller object is configured to control event and data exchange between two or more of the plurality of other objects of the web browser application on the client side, wherein the plurality of other objects of the web browser application are configured to be decoupled from each other based upon centralization of the web browser application logic and event exchange with the state controller object,
    wherein the web browser application is configured to:
        receive supply data via a network from a server application running on a server, the supply data to be used with a dynamic web page;
        communicate between the state controller object in the web browser application and the plurality of other objects via a delegate model, wherein the delegate model includes an event publisher and an event subscriber;
        render objects from the server application in the web browser application, wherein rendered objects include the plurality of other objects, the plurality of other objects including presentation logic GUI components;
        store, on the client side, state variable data in the web browser application to allow the web browser application to preserve a particular state of the web browser application; and
        recreate on the client side, without receiving additional supply data from the server-side script of the server application on the server side, a particular view of the web browser application based on a particular preserved state of the web browser application.

2. The invention according to claim 1, wherein:
    the other objects comprise presentation logic GUI components;
    the state controller object and presentation logic GUI components are in JavaScript;
    the web browser application communicates with the server application according to Ajax; and
    the web browser application has the presentation logic GUI components rendered by the server application to create the layout of the presentation logic GUI components on the web browser application.

3. The invention according to claim 2, wherein:
    the web browser application communicates with the server application to obtain business logic data, and wherein said business logic data is segregated from the data from the server application used to render the presentation logic GUI components;
    said business logic comprises data from the server application comprising results of a SQL query;
    the presentation logic GUI components include components selected from the group consisting of a grid view; a datalist control; a tree; a forms view; a details view; a combo box; a list box; a radio button; and a checkbox; and,
    wherein said presentation logic GUI components are for displaying information for a Storage Area Network.

4. The invention according to claim 2, wherein:
    the web browser application stores state variables to bookmark a state of the web browser application and recreate a same view shown by the web browser application.

5. The invention according to claim 1, wherein:
    the state controller object acts as a mediator class to coordinate data to and from other classes;
    the other objects comprise presentation logic GUI-based objects;
    the state controller object and presentation logic GUI components are in JavaScript and communicate with the server application according to Ajax;
    the web browser application has the presentation logic GUI components rendered by the server application to create a layout of the presentation logic GUI components on the web browser application;
    the web browser application communicates with the server application to obtain business logic data, wherein said business logic data is segregated from the data from the server used to render the presentation logic GUI components;
    said business logic data comprises data from the server comprising the results of a SQL query;
    the presentation logic GUI components communicate directly with the server application to obtain the business logic data;
    the presentation logic GUI components include components selected from the group consisting of a grid view; a datalist control; a tree; a forms view; a details view; a combo box; a list box; a radio button; and a checkbox; and,
    wherein said presentation logic GUI components are for displaying information for a Storage Area Network.

6. A method for handling objects associated with a dynamic web page in an encapsulated manner comprising:
    running a client-side script on a web browser application, wherein the web browser application comprises object-oriented modules, the object-oriented modules comprising a state controller object and a plurality of other objects, the state controller object configured to run completely within the web browser application as an extension of the web browser application's event handling to handle objects in an encapsulated manner on the client side, wherein the plurality of other objects of the web browser application are configured to operatively communicate event and data inputs with the state controller object of the web browser application;

receiving supply data via a network from a server-side script of a server application on a server side, the supply data configured to be used with a dynamic web page;

controlling state changes of two or more of the plurality of other objects by the state controller object on the client side, wherein each of the plurality of other objects of the web browser application includes an abstract interface as a wrapper whereby the state controller object is configured to control event and data exchange between the two or more of the plurality of other objects of the web browser application on the client side;

communicating between the state controller object in the web browser application and the plurality of other objects via a delegate model, wherein the delegate model includes an event publisher and an event subscriber;

rendering objects from the server application in the web browser application, wherein rendered objects include the plurality of other objects, the plurality of other objects including presentation logic GUI components;

storing, on the client side, state variable data in the web browser application to allow the web browser application to preserve a particular state of the web browser application; and recreating on the client side, without receiving additional supply data from the server-side script of the server application on the server side, a particular view of the web browser application based on a particular preserved state of the web browser application, wherein the plurality of other objects of the web browser application are configured to be decoupled from each other based upon centralization of the web browser application logic and event exchange with the state controller object.

7. The method according to claim 6, further comprising the steps of:

communicating business logic data from the server application to the web browser application;

communicating data from the server application for rendering objects in the web browser application, with data of the rendered objects segregated from the business logic data;

wherein the state controller object and the presentation logic GUI components are in JavaScript, and the web browser application communicates with the server application according to Ajax;

communicating the business logic data, the business logic data further including results of a SQL query;

wherein the presentation logic GUI components are components selected from a group consisting of a grid view; a datalist control; a tree; a forms view; a details view; a combo box; a list box; a radio button; and a checkbox;

displaying the presentation logic GUI components on the web browser application to display information for a Storage Area Network.

8. The method according to claim 6, wherein:

the presentation logic GUI components are components selected from the group consisting of a grid view; a datalist control; a tree; a forms view; a details view; a combo box; a list box; a radio button; and a checkbox, wherein the presentation logic GUI components are configured to form decoupled and interacting objects within the web browser application.

9. The invention according to claim 1, wherein
the state controller object is further configured to allow and disallow state changes of objects on the client side rather than a server side, the state changes including whether or not elements of a web page are displayed or hidden to a user of the web browser application.

10. The invention according to claim 6, wherein controlling state changes of two or more of the plurality of other objects by the state controller object on the client side further comprises:

allowing state changes of the two or more of the plurality of other objects by the state controller object on the client side;

disallowing state changes of at least a third particular object of the plurality of other objects by the state controller object on the client side;

showing at least one element of a web page in response to at least one of the steps of allowing state changes of the two or more of the plurality of other objects by the state controller object on the client side or disallowing state changes of at least a third particular object of the plurality of other objects by the state controller object on the client side; and hiding at least one element of the web page in response to at least one of the steps of allowing state changes of the two or more of the plurality of other objects by the state controller object on the client side or disallowing state changes of at least a third particular object of the plurality of other objects by the state controller object on the client side.

11. The invention according to claim 6, further comprising:
rendering the plurality of other objects on the client side only once for the dynamic webpage; and
refreshing the dynamic web page without further rendering of the plurality of other objects on the client side,
wherein the rendering the plurality of other objects only once for the dynamic webpage comprises delayed rendering.

12. The invention of claim 6, wherein the state controller is further configured to control the event and data exchange between two or more of the plurality of other objects of the web browser application on the client side when the web browser application is in a fixed state.

13. The invention of claim 1, wherein the state controller is further configured to control the event and data exchange between two or more of the plurality of other objects of the web browser application on the client side when the web browser application is in a fixed state.

14. A system including a client machine and a server, the client machine being communicatively coupled to the server via a network, the client machine including a non-transitory computer-readable medium comprising a web browser object-oriented application for a dynamic web page comprising:

a web browser application comprising a state controller object, the web browser application configured to run on a client side, the state controller object configured to run completely within the web browser application as an extension of the web browser application's event handling to handle objects in an encapsulated manner on the client side, the state controller object further configured to allow and disallow state changes of objects on the client side, the web browser application further comprising a plurality of other objects configured to operatively communicate with the state controller object, wherein each of the plurality of other objects of the web browser application includes an abstract interface as a wrapper whereby the state controller object is configured to control event and data exchange between two or more of the plurality of other objects of the web browser application on the client side, wherein the plurality of other objects of the web browser application are configured to be decoupled from each other based upon centralization of the web browser application logic and event exchange with the state controller object,
wherein the web browser application is configured to:
receive supply data via the network from a server application running on the server, the supply data to be used with a dynamic web page;
communicate between the state controller object in the web browser application and the plurality of other objects via a delegate model, wherein the delegate model includes an event publisher and an event subscriber;
render objects from the server application in the web browser application, wherein rendered objects include the plurality of other objects, the plurality of other objects including presentation logic GUI components;
store, on the client side, state variable data in the web browser application to allow the web browser application to preserve a particular state of the web browser application; and
recreate on the client side, without receiving additional supply data from the server-side script of the server application on the server side, a particular view of the web browser application based on a particular preserved state of the web browser application.

15. The invention according to claim 14, wherein:
the other objects comprise presentation logic GUI components;
the state controller object and presentation logic GUI components are in JavaScript; the web browser application communicates with the server application according to Ajax; and
the web browser application has the presentation logic GUI components rendered by the server application to create the layout of the presentation logic GUI components on the web browser application.

16. The invention according to claim 15, wherein:
the web browser application communicates with the server application to obtain business logic data, and wherein said business logic data is segregated from the data from the server application used to render the presentation logic GUI components;
said business logic comprises data from the server application comprising results of a SQL query;
the presentation logic GUI components include components selected from the group consisting of a grid view; a datalist control; a tree; a forms view; a details view; a combo box; a list box; a radio button; and a checkbox; and, wherein said presentation logic GUI components are for displaying information for a Storage Area Network.

17. The invention according to claim 15, wherein:
the web browser application stores state variables to bookmark a state of the web browser application and recreate a same view shown by the web browser application.

18. The invention according to claim 14, wherein:
the state controller object acts as a mediator class to coordinate data to and from other classes;
the other objects comprise presentation logic GUI-based objects;
the state controller object and presentation logic GUI components are in JavaScript and communicate with the server application according to Ajax;
the web browser application has the presentation logic GUI components rendered by the server application to create a layout of the presentation logic GUI components on the web browser application;
the web browser application communicates with the server application to obtain business logic data, wherein said business logic data is segregated from the data from the server used to render the presentation logic GUI components;
said business logic data comprises data from the server comprising the results of a SQL query;
the presentation logic GUI components communicate directly with the server application to obtain the business logic data;
the presentation logic GUI components include components selected from the group consisting of a grid view; a datalist control; a tree; a forms view; a details view; a combo box; a list box; a radio button; and a checkbox; and, wherein said presentation logic GUI components are for displaying information for a Storage Area Network.

19. The invention according to claim 14, wherein the state controller object is further configured to allow and disallow state changes of objects on the client side rather than a server side, the state changes including whether or not elements of a web page are displayed or hidden to a user of the web browser application.

20. The invention according to claim 14, wherein the state controller is further configured to control the event and data exchange between two or more of the plurality of other objects of the web browser application on the client side when the web browser application is in a fixed state.

* * * * *